Figure 1:
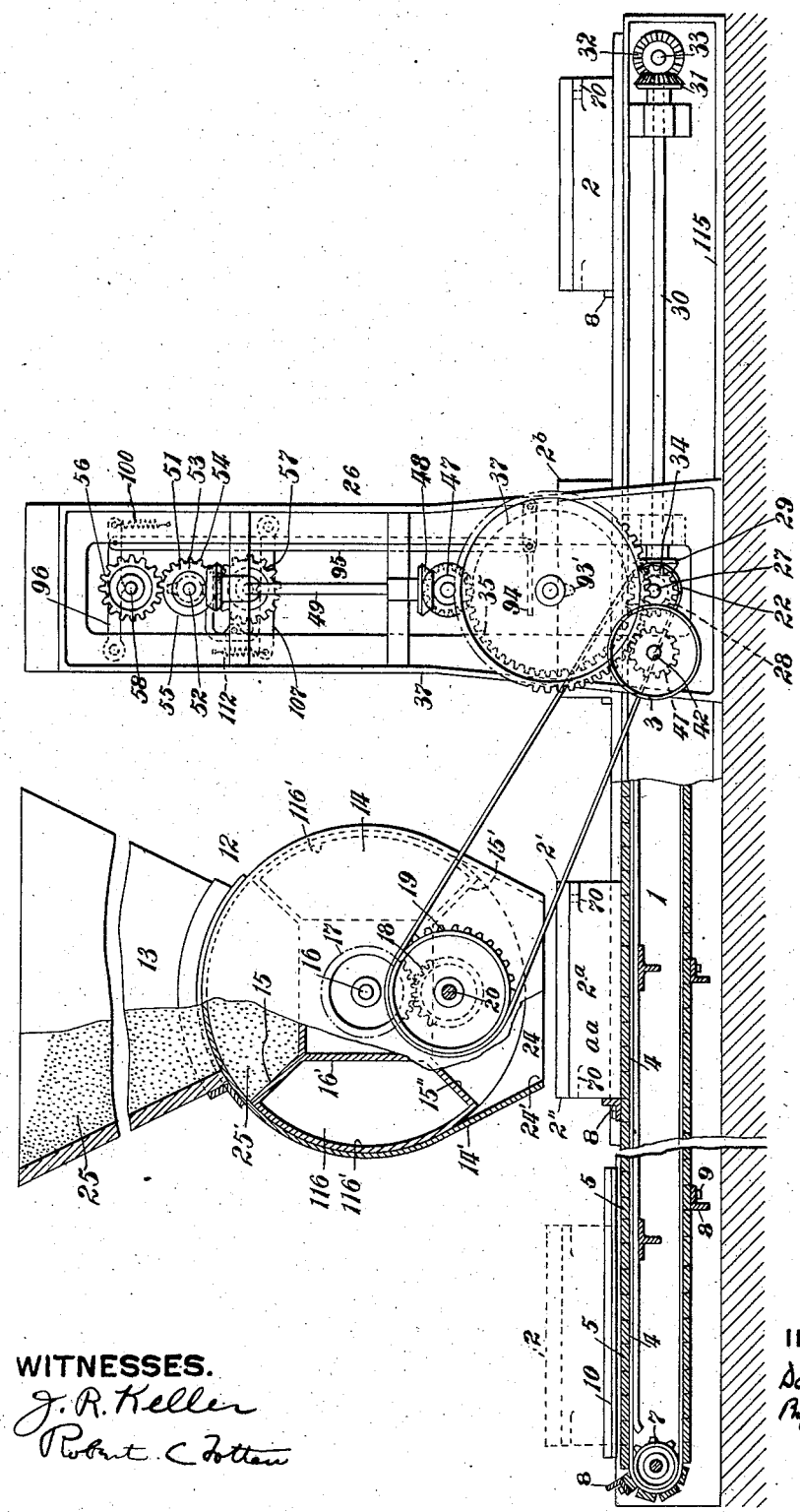

D. M. FAHNESTOCK.
MOLDING APPARATUS.
APPLICATION FILED FEB. 25, 1911.

1,027,115.

Patented May 21, 1912.

4 SHEETS—SHEET 1.

WITNESSES.
J. R. Keller
Robert C. Totten

INVENTOR
David M. Fahnestock
By Kay & Totten
Attorneys

D. M. FAHNESTOCK.
MOLDING APPARATUS.
APPLICATION FILED FEB. 25, 1911.

1,027,115.

Patented May 21, 1912.
4 SHEETS—SHEET 2.

WITNESSES.

INVENTOR.

D. M. FAHNESTOCK.
MOLDING APPARATUS.
APPLICATION FILED FEB. 25, 1911.
1,027,115.
Patented May 21, 1912.
4 SHEETS—SHEET 3.
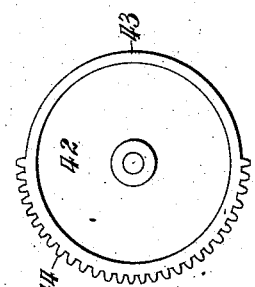
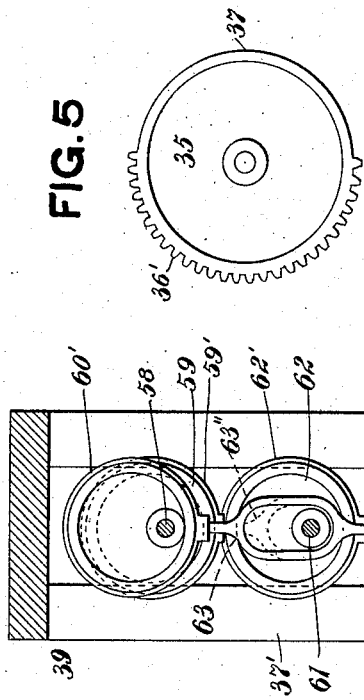
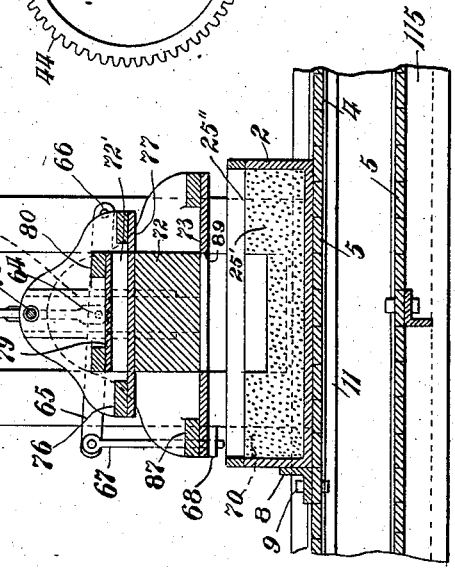
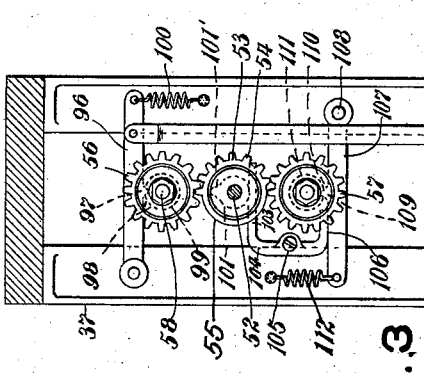
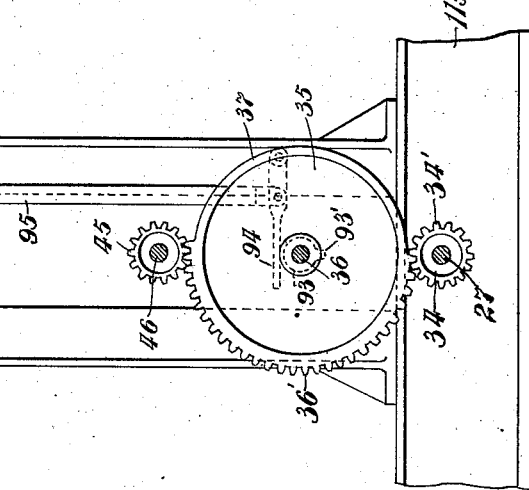
WITNESSES.
J. R. Keller
Robert C. Totten
INVENTOR.
David M. Fahnestock
By Kay & Totten
Attorneys D. M. FAHNESTOCK.
MOLDING APPARATUS.
APPLICATION FILED FEB. 25, 1911.
1,027,115.
Patented May 21, 1912.
4 SHEETS—SHEET 4.
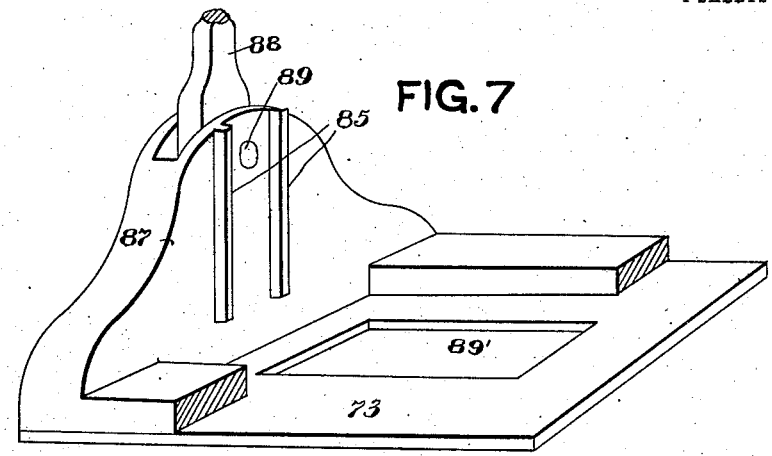
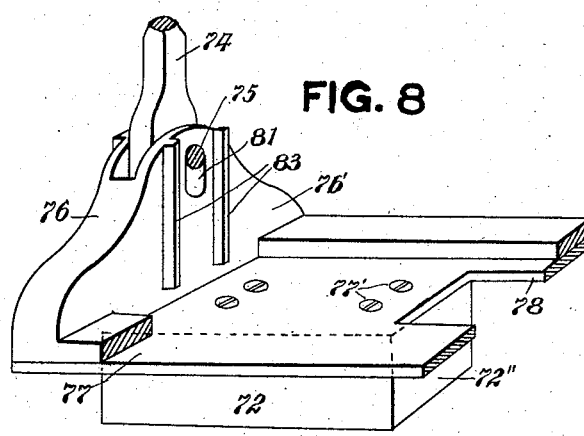
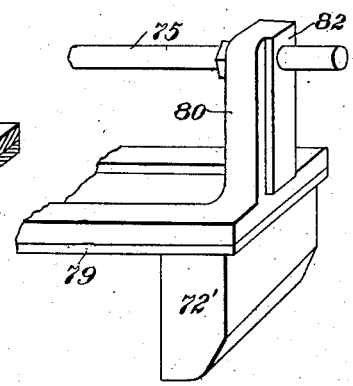
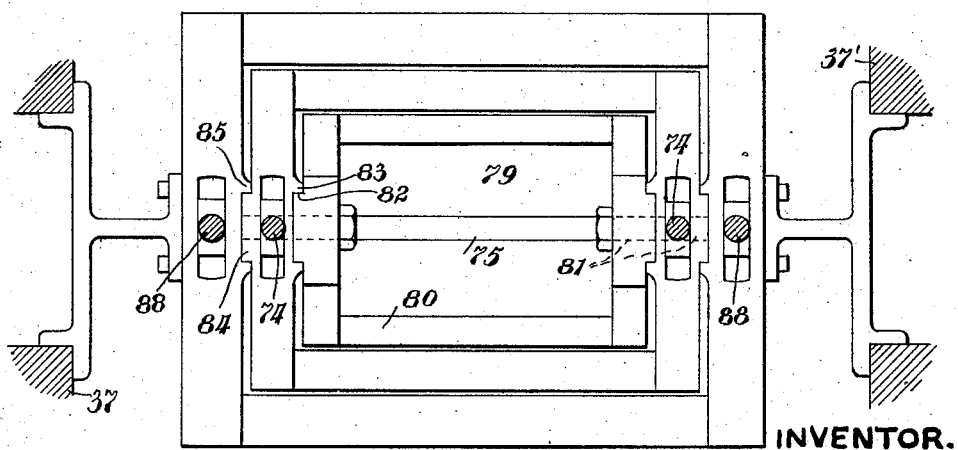
WITNESSES.
J. R. Keller
Robert C. Totten
INVENTOR.
David M. Fahnestock
By Kay & Totten
attorneys

UNITED STATES PATENT OFFICE.

DAVID M. FAHNESTOCK, OF PITTSBURGH, PENNSYLVANIA.

MOLDING APPARATUS.

1,027,115.  Specification of Letters Patent.  Patented May 21, 1912.

Application filed February 25, 1911. Serial No. 610,857.

*To all whom it may concern:*

Be it known that I, DAVID M. FAHNE-STOCK, a citizen of the United States, and resident of Pittsburgh, in the county of Allegheny and State of Pennsylvania, have invented a new and useful Improvement in Molding Apparatus; and I do hereby declare the following to be a full, clear, and exact description thereof.

My invention relates to apparatus for use in making molds including a complete plant for carrying a multiplicity of flasks, improved means for inserting molding material in the flasks and means for forming a mold in the molding material. Its object is to provide an apparatus adequate to and suitable for the practice of the method of making molds described and claimed in another application for Letters Patent, Serial No. 610,858, of even date herewith.

The general object therefore is to provide improved means for producing a mold which will insure a perfect cast, especially where molten steel is employed and particularly by producing a hard surface of compact molding material such as sand in the mold, and to thereby obviate the production of imperfect molds, and to consequently produce a greater number of molds at less expense and also in less foundry space.

In the said accompanying application, Serial No. 610,858, I have described fully and claimed broadly not only the entire process or method of operation which I preferably follow, but also the main steps or sub-processes which are regarded as individually novel in mold forming practice. I shall therefore herein describe merely the complete operation as preferably followed, together with the form of apparatus herein illustrated and embodying a preferred type of apparatus within the scope of the appended claims.

In the preferred practice I first insert the sand or similar molding material in a flask or like receptacle constituting one of a series carried in a continual defined course preferably on an endless conveyer. The molding material is inserted in the flask by pouring it thereinto while the flask is in motion, the improved apparatus, described below, being adapted to evenly distribute the material at the desired level by pouring it progressively from the forward or approaching to the rear or receding end of the flask as it passes beneath the sand pouring apparatus. I then interrupt the motion of the flask by stopping the endless conveyer at a given point and forcing a pattern, preferably of a preferred sectional construction, into the material thus compacting the same beneath the pattern. This dispenses with the use of a pressing or squeezing machine, as the end, in this case bottom, of the pattern, is effectively packed by the pressure of insertion of the pattern itself.

The sectional pattern preferably employed is made up of two or more reciprocally and relatively movable parts, one of the parts adapted to form the projecting portion or portions of the mold being forced into the final position in the molding material after the insertion of the main portion of the pattern is completed. I then further compact the molding material about the side portions of the pattern by applying a pressure plate having a slot or opening conforming closely to the contour in horizontal section of the pattern to the upper surface of the molding material around the pattern. This presser plate is constructed preferably to cover substantially the entire exposed surface of the molding material so that the entire mold is firmly compacted.

My invention includes the improved means for conveying a multiplicity of flasks, inserting molding material in each flask while in motion, interrupting the motion of the conveying mechanism, fastening a flask in fixed position, forming the mold therein, and then resuming the conveyance of the flasks.

It also comprises the novel arrangements and combinations of apparatus as hereinafter more specifically described and claimed.

My invention also includes the improved apparatus for forming the mold, comprising means for arresting the flask in fixed position, means for inserting and withdrawing the pattern, the presser plate, and the means provided for forcing the presser plate along and about the pattern and for withdrawing the presser plate as well as the pattern. The said mold forming apparatus is claimed, however, in another or divisional application, Serial No. 629,366 filed May 25th, 1911.

Figure 2:
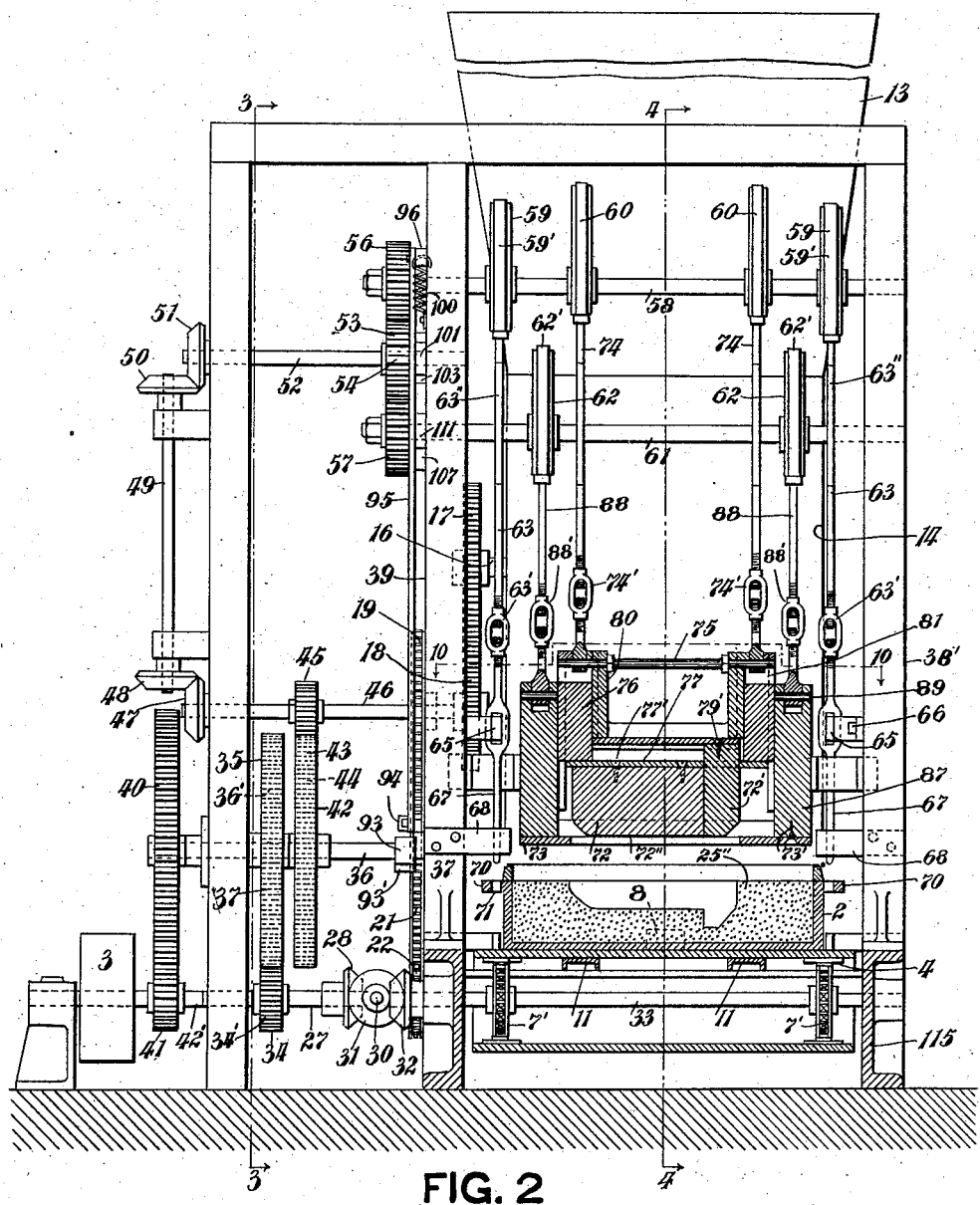

In the accompanying drawings illustrating one form of my apparatus, Figure 1 is a vertical elevation partly in longitudinal section of a complete plant or apparatus of the character described. Fig. 2 is a vertical transverse elevation partly in section through the mold forming apparatus proper. Fig. 3 is a vertical longitudinal section of the same on the line 3—3 Fig. 2. Fig. 4 is a vertical longitudinal section of the same on the line 4—4 Fig. 2. Figs. 5 and 6 are detail side views illustrating the main gear wheels employed as hereinafter designated. Fig. 7 is a detail perspective view partly in section of the pressing plate and cross head carrying the same. Fig. 8 is a like view of a pattern and its cross head. Fig. 9 is a detail fragmentary view illustrating a movable portion of the pattern and carrying means therefor preferably employed, and Fig. 10 is a horizontal section through the mold forming apparatus on the line 10—10 Fig. 2.

The endless conveyer 1 illustrated carries the flasks 2, and is driven from any source of power, indicated by the belt wheel 3. The conveyer 1 is made up of mutually pivoted links 4, 4, carrying the transverse pallets or supports 5, 5, etc., as illustrated in Figs. 1 and 2, the links 4, 4, etc., intermeshing with the sprocket wheels 7, 7' arranged at opposite ends of the plant or apparatus. The pivotally connected pallets 5 are preferably supported by the trackway 11 supported by the cross beams 11' fastened to the side-sills 115 of the apparatus. The conveyer 1 is provided with the adjustable cleats or lugs 8 which are fastened to the pallets 5 by suitable means, such as the bolts 9. The cleats 8 can thus be changed in position to accommodate flasks of varying sizes, although in general they will be maintained in fixed position at regular intervals apart in conformity with the timing of the gear driving system of the apparatus. The flasks 2 are preferably placed on the conveyer by first laying one of them upon the table 10 consisting of supports arranged on opposite sides of the conveyer 1 and adapted to support the flask a slight distance above the conveyer until it is engaged by one of the cleats 8 and removed thereby from the table. The flask 2 is then carried in its course underneath and past the sand pouring apparatus 12. This apparatus 12 comprises the hopper 13 into which the molding material 25, such as sand, can be regularly poured from a suitable nozzle or can be dumped at intervals as desired; and the rotary flask filler 14. The flask filler 14 has preferably the drum 14' and the segmental pouring receptacles 15, 15 which are adapted to hold a determined proper amount of molding material 25' to completely fill one of the flasks 2. The receptacles 15 are carried by a spider 16' rotated by a suitable shaft 16 driven through the gear wheels 17, 18 and sprocket wheel 19 on the shaft 20 of the gear wheel 18, by means of a sprocket chain 21 and sprocket wheel 22 (Fig. 2) actuated from the power source in a manner specifically described below. Any desired number of such receptacle sections 15 may be employed, two being illustrated, and separated by the blank sections 116 having the cover-walls 116'. The rate of motion of the shaft 16 carrying the flask filling receptacles 15 is, however, timed, through the gearing just described or in any desired manner, so that the front wall 15' of any given filler receptacle 15 will commence to pour sand through the pouring opening 24 just as the forward wall 2' of any given flask 2ª is passing beneath the rear wall 24' of the opening 24. The receptacle 15 will thus be in completely opening position when a given flask 2ª is beneath the entire opening 24 of the drum 14', as illustrated in Fig. 1. As the flask recedes from or passes beyond the opening 24, the rear wall 15" of a section 15 also passes with the flask, so that no molding material is wasted or spilled behind the receding or rear wall 2" of the flask. As the pouring receptacles 15 are driven through the same driving connections, namely, the shaft 27 and gear wheels 34, 35, from the driving pulley 3 as the conveyer 1, a proper mechanical construction of connecting gearing will insure the proper moving position of each flask 2 beneath the pouring opening 24 as the corresponding pouring receptacle 15 revolves above the pouring opening 24, and the desired constant quantity of molding material 25' carried by the said receptacle 15 will be poured into the flask so as to fill it up to the desired level.

The movement of the conveyer 1 carries the flasks successively along their course from the position 2ª beneath the sand pouring apparatus to the position 2ᵇ beneath the mold forming apparatus 26. As each flask reaches the position 2ᵇ the movement of the conveyer 1 is stopped long enough to permit the mold forming operation, including both the operations of inserting and withdrawing the pattern and pressing the molding material about the same. As indicated above, the sprocket wheel 22 is mounted on the countershaft 27, which also drives, through the bevel gears 28, 29 rotating shafts 30 and bevel gears 31, 32 and shaft 33, the sprocket wheels 7' which actuate the endless conveyer 1. The shaft 27 carries the gear wheel 34 having a complete set of gear teeth 34' with which the gear teeth 36' of the driving gear wheel 35 intermesh to rotate the gear wheel 34. The gear wheel 35, however, is provided with the delay face 37, the number of gear teeth 36 being so arranged that the delay face 37 reaches the teeth 34' of the gear wheel 34 just as a flask reaches the position 2ᵇ within the mold forming apparatus 25. The motion of the conveyer 1 and of the pouring receptacles 15 is therefore interrupted, the friction of the conveyer on the carrying track 11, and the action of the flask pinning device to be described below serving to fix the flask in exact registering position for receiving the pattern. The pattern inserting and mold pressing apparatus is then actuated through the driving gear wheel 42 carried preferably on the same driving shaft 36 as that which carries the gear wheel 35, being journaled suitably in the frame 39 of the mold forming machine 26 and carrying also the gear wheel 40 having a continuous set of spur gears in mesh with the small gear wheel 41 carried on the short shaft 42' rotated by the power shaft 3, as illustrated in Figs. 1 and 2.

The gear wheel 42 has a set of spur gears 44 of determined number adapted to mesh with the gear wheel 45 carried on the shaft 46, and has also a delay face 43 arranged to rotate idly past said gear wheel 45 when the spur gears 36 of the gear wheel 35 are in mesh with the gear wheel 34, and the conveyer is therefore in motion. The gear teeth 44 are arranged to come into mesh with the gear wheel 45 just as the delay face 37 of the gear wheel 35 arrives at the teeth 34' of the wheel 34 so that the wheel 45 is positively rotated just as the conveyer 1 stops its movement.

The shaft 46 drives, through the bevel gears 47, 48, the vertical shaft 49 and bevel gears 50, 51, the horizontal shaft 52 carrying the gear wheel 53. This gear wheel 53 is provided with the gear teeth 54 and delay face 55, and directly actuates and coöperates in the control of the pattern moving and sand pressing mechanism, as hereinafter set forth. The relative number of gear teeth on the wheel 53 and length of its delay face 55, as well as the relative number of gear teeth and length of delay faces on the wheels 35, 42 are so adjusted in connection with the connecting gearing, that the entire pattern inserting and mold pressing operation, including the withdrawal of the pattern and of the pressing device is completed by the time that the gear wheel 42 has rotated sufficiently to bring the delay face 43 again opposite to the adjacent teeth of the gear wheel 45, the delay face 37 of the gear wheel 35 having then passed completely by the gear wheel 34 and the teeth 36' being again intermeshed with the gear wheel 34 to resume the driving of the shaft 27, and therefore both of the conveyer 1 and of the flask filling device 12.

The gear wheel or pinion 53 which directly actuates the pattern carrying and mold pressing apparatus proper, has the gear teeth 54 arranged to mesh with the gear teeth of the gear wheels 56 and 57, respectively, and the delay face 55 arranged to pass by said gear wheels idly when one of the gear teeth 54 is in mesh with the spur gearing of the other of said wheels. The gear wheel 56 is keyed or otherwise fastened to the shaft 58, on which are mounted the two sets of eccentrics 59 and 60. The gear wheel 57 is likewise fastened to the shaft 61 on which are mounted the eccentrics 62. The straps 59' of the eccentrics 59 are attached to the connecting rods 63 each preferably provided with suitable turnbuckles 63' and with bifurcated portions 63" which straddle the shaft 61 as illustrated in Fig. 4. Each connecting rod 63 is pivotally joined by a wrist pin 64 to one of the levers 65 each pivoted at 66 to one of the opposite upright members 38' of the machine frame 39, as illustrated in Figs. 2 and 4. Each lever 65 pivotally carries a vertically mounted fastening pin 67 which plays reciprocally within one of the slotted guides 68 attached to diagonally opposite members 37, 37' of the machine frame. The flasks 2 are each provided with ears 70 arranged near diagonally opposite corners of the flasks and having slots 71 through which the pin 67 is forced by the downward throw of the eccentrics 59. By this means each flask 2 is arrested in exact registering position beneath the suspended pattern illustrated at 72 and suspended presser plate 73, as the gear teeth 44 of the gear wheel 42 are arranged to actuate the gear wheel 45 and the gear pinion 53 driven thereby preferably just before the delay face 37 of the driving gear 35 has arrived opposite the gear wheel 34, so that the throw of the eccentrics 59 will bring the fastening pins 67 into engagement with the slots 71 just as the said slots arrive beneath the said pins and thereby temporarily fasten the flask 2 in the desired position 2$^b$. The eccentrics 60, which are carried by the same shaft 58 as the eccentrics 59 above described, are retarded somewhat in throw as compared to the eccentrics 59, so that their connecting rods 74 will not be lowered until the flask 2 is pinned in proper position by the registering pins 67.

Each of the rods 74 is preferably provided with a suitable turnbuckle 74' for the purpose of adjusting the distance of insertion of the pattern 72 within the molding material 25'. The rods 74 carry the wrist pin 75 which supports and actuates the cross head frame 76 having the pattern plate 77 to which is removably attached, as by the set screws 77', the pattern 72 employed. The downward travel of the rod 74 therefore forces the pattern 72 into molding material 25', and compacts the molding material below and against the pattern 72. The pattern 72 is preferably formed in sections, in order to improve the character of the mold where it is irregular in contour, two such sections 72, 72' being illustrated.

The projecting portion 72' of the simple pattern shown is reciprocally movable through the aperture 78, in the pattern plate 77 and fits against the mating face 72" of the main portion 72 of the pattern. The projecting portion 72' is attached, as by the set screws 79', to the secondary pattern plate 79 carried by the secondary cross head 80 in which is journaled the wrist pin 75, as illustrated in Figs. 2, 8 and 9. The wrist pin 75 is reciprocally movable within the slot 81 of the cross head 76, and the cross head 80 is provided with the tongues 82 which are reciprocally movable within the guides 83 arranged in pairs within the opposite side portions of the cross head frame 76. The cross head frame 76 is likewise provided with interiorly positioned tongues 84 which are reciprocally movable within the pairs of guides 85 arranged vertically on the inside of the presser plate carrying cross head 87 carrying the presser plate 73, as will be described more fully below.

During the downward travel of the rods 74 the cross head frame 76 is suspended from the wrist pin 75 which bears against the top portion of the slots 81, so that the secondary mold carrying cross head 80 and projecting portions 72' of the pattern are held in upwardly retracted position until the main portion 72 of the pattern has entered the molding material 25' within the flask 2. As the motion of the main portion 72 of the pattern is resisted by the molding material 25', the wrist pin 75 passes to the bottom of the slots 81, carrying with it the secondary cross head 80 and secondary portions 72' of the pattern. This portion 72' is thereby forced into the molding material until the secondary pattern plate 79 strikes the main pattern plate 77 or until the wrist pin 75 strikes the lower portions of the slots 81, thereby completing the mold within the molding material 25'.

As soon as the above indicated movement is finished, the gear teeth 54 of the wheel 53 leave the intermeshing teeth of the gear wheel 56. A cam 93 is mounted on the shaft 36 and provided with a projecting portion 93', which had previously engaged the lever 94, which raises by the link 95 the lever 96 provided with the dog 97 adapted to engage the slot 98 on the hub 99 of the wheel 55, releases the lever 94 and allows the dog 97 to reëngage the slot 98 under the influence of the spring 100 and fix the gear wheel 56 in stationary position. The complete pattern 72, 72' is therefore held in projected position within the molding material 33. A slight further rotation of the gear pinion 53 brings the projecting portion 101' of the cam 101 carried on the shaft 52 into engagement with the arm 103 of the lever 104, pivoted at 105 to the member 37 of the frame and having a finger 106 engaging with the lever 107 pivoted at 108 to the opposite member 37 of the frame and provided with the dog 109 in engagement with the slot 110 in the hub 111 of the gear wheel 57. The dog 109 is thereby retracted from engagement with the slot 110 against the tension of the spring 112, and as the gear teeth 54 come into mesh with the teeth of the gear 57, the shaft 61 is rotated. The rods 88 connected to the strap 62' of the eccentric 62 are thereby lowered carrying with them the cross head frame 87 to which they are pivotally connected by the wrist pins 89. Each rod 88 is also preferably provided with the turnbuckle 88' for the purpose of adjusting the travel of the presser plate 73 carried by the cross head 87 into the molding material 33. The said presser plate 73 has the slot 89' conforming to the contour of the pattern 72, 72'. The presser plate 73 is preferably formed of metal and removably supported upon the cross head frame 87, as by the set screws 73' so that whenever the pattern, as 72, employed is removed from the cross head 76 and a new one substituted, the presser plate 73 may be changed so as to conform in contour as closely as possible to the contour in horizontal section of the new pattern used. The presser plate 73 is forced by the eccentrics 62 and rods 88 against the exposed upper surface 25" of the molding material and its downward motion continued sufficiently to effectively compact the same about the pattern 72. By my present invention I therefore provide means for inserting a pattern the desired distance within each of the flasks as it is moved into position by the conveyer and also for pressing the molding material about the pattern before the motion of the conveyer is resumed.

In the apparatus shown, I arrange the gear teeth 54 on the gear wheel 53 so that they will reëngage the gear wheel 56 as soon as the downward pressing of the molding material by the plate 73 is completed, the cam 101 having released the lever 104 so that the dog 109 holds the gear wheel 57 in fixed, and therefore the cross head 87 and pressing plate 73 in downwardly extended position. The reëngagement of the revolving teeth 54 with the gear wheel 56 has the effect of rotating the shaft 58 and withdrawing both the fastening pin 67 and the pattern 72 from the flask 2 by the upward throw of the eccentrics 59 and 60 respectively. In the form of apparatus illustrated the connecting rod 74 first raises the wrist pin 75 with the slots 81 of the cross head frame 76 before the abutting of said wrist pin 75 against the upper portion of said slots 81 results in the raising of the cross head frame 76. The projecting portion 72' of the pattern is thereby first retracted and then the entire pattern 72, 72' in the further upward motion of the rods 74. This upward motion having been finished, the delay face 55 of the pinion 53 again arrives at the gear teeth of the wheel 56 and the gearing 54 again intermeshes with the gear wheel 57 so as to rotate the shaft 61 and thereby withdraw upwardly the rods 88 through the action of the eccentric 62. The presser plate 73 is thereby carried upwardly by the cross head 87 until the upward motion of the rods 88 is arrested by the delay face 55 of the pinion 53 and the reëngagement of the dog 109 with the slot 110 of the gear wheel 57.

The above described mold forming operations are all performed in this apparatus while the gear teeth 44 on the large gear wheel 42 are rotating the small gear wheel 45. The last of the spur gears 44 of determined number having passed the gear wheel 45, the delay face 43 then rotates idly past the said wheel 45 while the spur gears 36, having reëngaged the gear wheel 34, rotate the shaft 27 and thereby remove the flask in which the mold has just been formed from the position 2$^b$ and carry the succeeding flask past the position 2$^a$ to the position 2$^b$, it being filled in its course through the position 2$^a$ by the required quantity of molding material 25′, as above described.

The operation of the plant or apparatus above described is complete and automatic, the only manual steps necessary being the placing of the empty flasks upon the table 10, and the removal of the flasks containing the molds as they are delivered by the conveyer 1. Moreover, it will be well understood by persons skilled in the art that a suitable delivery table or delivering conveyer may be employed, if desired, to receive and carry away the flasks containing the finished mold and indeed the empty flasks may be furnished to the conveyer 1 by any desired mechanical means, if found preferable.

The term flask as used in the accompanying claims is intended to cover any receptacle for receiving and carrying the molds.

What I claim is:

1. In molding apparatus, the combination with an endless conveyer adapted to carry flasks and pouring means for inserting molding material in the flasks while in motion, and mechanism for simultaneously actuating said conveyer and said pouring means, of pattern inserting means in the path of the flasks on the conveyer, and means for successively actuating said conveyer, and said pattern inserting means, substantially as described.

2. In molding apparatus, the combination with a conveyer adapted to carry flasks and pouring means for inserting molding material in the flasks while in motion, and pattern inserting means adapted to insert a pattern in each of the flasks on the conveyer, driving connections for simultaneously actuating said conveyer and said pouring means, driving connections for actuating said pattern inserting means, and mechanism connecting said driving connections to a source of power, and arranged to actuate the same alternately.

3. In molding apparatus, the combination with an endless conveyer adapted to carry flasks, and means for inserting molding material in each of the flasks, of a movably carried pattern, inserting means arranged to insert said pattern in each of said flasks successively and withdraw the same therefrom, and means for alternately actuating said conveyer and said pattern inserting means.

4. In molding apparatus, the combination with an endless conveyer adapted to carry flasks and pouring means for inserting molding material in the flasks while in motion and mechanism for simultaneously actuating said conveyer and said pouring means, of mold forming apparatus in the path of the flasks on the conveyer, and driving connections between said conveyer and the source of power, and a driving connection between said mold forming mechanism and the source of power, said driving connections being provided with means for alternately interrupting their respective drives, substantially as described.

5. In molding apparatus, the combination of an endless conveyer, a shaft operatively connected thereto, mold forming apparatus and a shaft operatively connected thereto, gear wheels carried by said shafts respectively, a driving shaft connected to the source of power and two gear wheels carried thereby and each provided with gear teeth arranged to mesh with the aforesaid gear wheels respectively, and with delay faces whereby when the gear teeth of one of said last mentioned wheels are enmeshed those of the other are idle, substantially as described.

6. In molding apparatus, the combination with a conveyer adapted to carry flasks and actuating gearing between said conveyer and the source of power including a gear wheel having a delay face, with mold forming apparatus adapted to insert a pattern in each of the flasks when at rest, and actuating gearing between said mold forming apparatus and the source of power coöperating with aforesaid actuating gearing and including a gear wheel having a delay face, whereby the conveyer and the mold forming apparatus are alternately actuated.

7. In molding apparatus, the combination with an endless conveyer adapted to carry flasks and gearing connecting the same to the source of power including a gear wheel provided with a delay face, of means for fastening one of said flasks in fixed position, and gearing connecting said fastening means to the source of power including a gear wheel provided with a delay face and with gear teeth arranged to be intermeshed when the gear teeth of the aforesaid gear wheel are rotating idly, substantially as described.

8. In molding apparatus, the combination of an endless conveyer, flasks carried thereby and each provided with a slot, actuating mechanism connecting said conveyer to a source of power, a movable pin, and mechanism connecting the same to the source of power and arranged to insert said pin in said slot when the motion of the conveyer is stopped, substantially as described.

9. In molding apparatus, the combination of an endless conveyer, flasks carried thereby each provided with ears having vertically extending slots, actuating mechanism for said conveyer adapted to impart an interrupted motion, movable pins mounted above said conveyer, and actuating mechanism therefor arranged to be set in action to insert said pins in said slots when the motion of the conveyer is stopped.

10. In molding apparatus, the combination of a conveyer, flasks carried thereby each provided with slots, mechanism for actuating said conveyer arranged to impart an interrupted motion thereto, reciprocally movable pins arranged above said conveyer, eccentrics carrying said pins, and mechanism actuating said eccentrics and adapted to insert the same in said slots, and withdraw them therefrom while the motion of the conveyer is interrupted.

11. In molding apparatus, the combination of a conveyer arranged to carry flasks, pouring means for inserting the molding material therein, a movably mounted pattern, and driving connections for simultaneously actuating said conveyer and said pouring means, and means actuated when said connections are at rest for inserting said pattern in a flask and withdrawing it therefrom.

12. In molding apparatus, the combination of a conveyer arranged to carry flasks, pouring means for inserting molding material therein, mold forming apparatus arranged in the path of the flasks on the conveyer and comprising pattern inserting means and sand pressing means, connections for simultaneously actuating said conveyer and said pouring means, connections for actuating said mold forming apparatus, and mechanism connecting said connections to a source of power and arranged to actuate the same alternately.

13. In molding apparatus, the combination with a conveyer adapted to carry flasks, mechanism for actuating said conveyer arranged to interrupt its movement, pattern inserting means arranged to insert a pattern in each flask when at rest, and means for fastening each flask in fixed position to receive the pattern, substantially as described.

In testimony whereof, I the said DAVID M. FAHNESTOCK, have hereunto set my hand.

DAVID M. FAHNESTOCK.

Witnesses:
ALVAR C. PURDY,
ROBERT C. TOTTEN.